March 17, 1942.  A. T. GREGORY  2,276,301
ANTIFRICTION BEARING
Filed Oct. 27, 1939
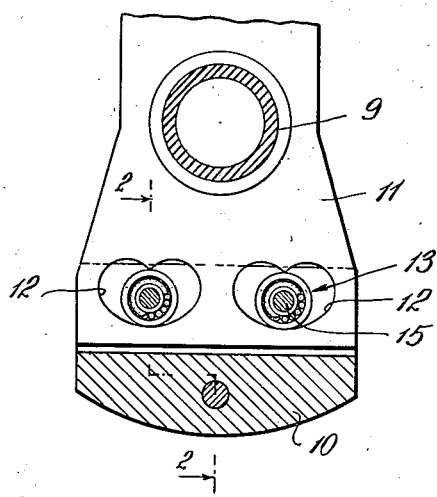
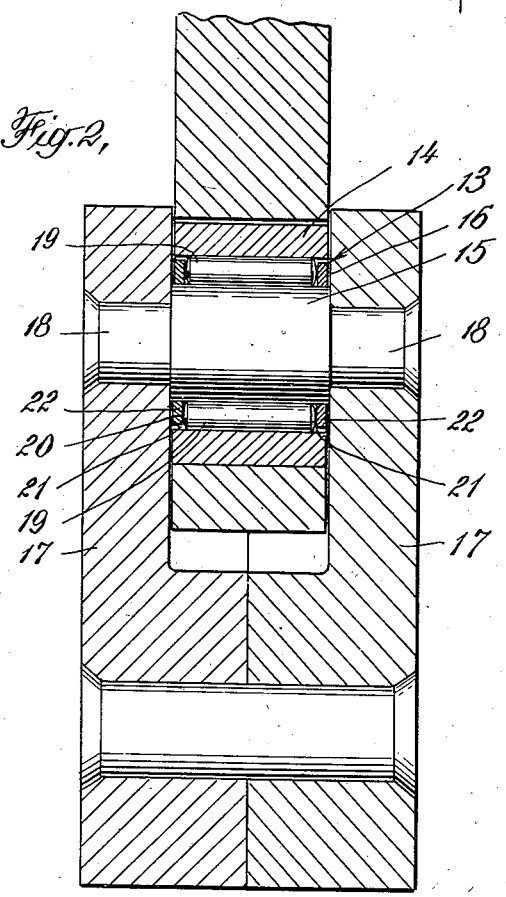
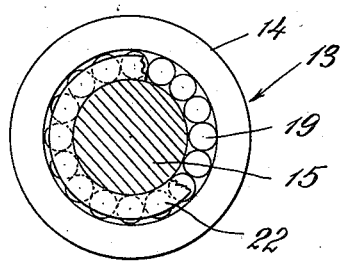
INVENTOR
Alfred T. Gregory
BY
Hoguet, Neave Campbell
ATTORNEYS Patented Mar. 17, 1942

2,276,301

UNITED STATES PATENT OFFICE 2,276,301

ANTIFRICTION BEARING

Alfred T. Gregory, Farmingdale, N. Y., assignor to Fairchild Engine and Airplane Corporation, Farmingdale, N. Y., a corporation of Maryland Application October 27, 1939, Serial No. 301,520

3 Claims. (Cl. 308—207)

This invention relates to anti-friction bearings and has particular reference to improvements in the construction of bearings of the needle type.

In case where needle bearings of the conventional type are subjected to very heavy loads under varying rotative speeds and high oscillating frequency conditions, as in an oscillating pendulous damping device, such as is disclosed in copending application Serial No. 281,844, filed June 29, 1939, by Chester C. De Pew, Piston connecting rods, and the like, the needles tend to become displaced out of the radial plane into a generally spiral formation and consequently rub at their ends and jam against the retaining side plates, the resulting friction thus augmenting the spiralling tendency and greatly increasing bearing friction and wear.

In accordance with the present invention, a needle bearing structure is provided which minimizes the dragging of the ends of the needles against the retaining side plates and consequently reduces and largely eliminates the spiralling tendency, thus restoring the satisfactory operation to the bearing under the most extreme conditions of heavy load and high frequency oscillations. These desirable results are achieved by spacing the retaining side plates from the ends of the needles of the bearing and interposing between each side plate and the corresponding ends of the needles a floating ring or washer which takes the end thrust of the needles without relative movement between the needles and the ring, since the floating characteristics of the ring enables it to adjust itself angularly relatively to the corresponding retaining side plate, thus largely eliminating the spiralling by reducing one of the principal causes thereof.

It will be seen that this simple arrangement renders needle bearings, with their advantages of lightness, small space requirements, and high anti-friction efficiency, useful and reliable for heavy varying loads and reduces the wear and frictional drag thereon wherever the rings are used.

For a more complete understanding of the invention, reference may be had to the accompanying drawing, in which:

Figure 1 is an elevation, partially in section, of the oscillating pendulous damping device for engine crankshafts disclosed in said copending application, which is depicted herein merely for purposes of illustrating one application of the needle bearing of this invention;

Fig. 2 is an enlarged section therethrough, as seen along the line 2—2 of Fig. 1, and illustrates the construction of the bearing; and Fig. 3 is an enlarged side view of the bearing.

Referring to Fig. 1, the pendulous mass 10 is suspended from the radial cheek 11 of crankshaft 9 by means of two spaced wheels generally designated 13, and rolling on corresponding curved tracks 12 as the mass 10 oscillates relatively to the crankshaft in response to torsional vibrations of the latter. The rims 14 of the wheels 13 constitute, in this adaptation, the outer race of the bearing of this invention, which is radially spaced from the inner race 15 of the bearing so as to provide the usual annulus 16. The inner race 15 in this adaptation is a stub-shaft which spaces the two outer plates 17 of the pendulous mass, and which is provided with reduced ends 18 passing through plates 17 and riveted over to secure the plates rigidly together, as shown particularly in Fig. 2. Obviously, the inner race 15 may be a ring as well as a solid member, as shown, and similarly, the outer race 14 may be a solid member rather than the ring, as shown, the races 14 and 15 being adapted to rotate relatively about their common axis in the usual way.

Interposed in the annulus 16 is a circular series of needles 19, which have their ends 20 slightly rounded, as shown, and which are shorter than the axial length of the annulus 16, this length being determined by the plates 17, which act as retaining side plates for the needles 19. In this instance the retaining side plates 17 are fixed to the inner race 15, but they may be fixed to the outer race 14, depending upon requirements. Also, in this adaptation of the needle bearing of this invention, the outer race 14 rotates relatively to the inner race 15, but it will be understood that the outer race may be fixed relatively to a rotary inner race 15 in accordance with requirements, and that other variations common to needle bearings may be employed with equal facility.

The difference in axial length between the needles 19 and the annulus 16, as determined by the retaining side plates 17, provides a narrow circular space 21 in the annulus 16 between the ends of the needles 19 and the corresponding retaining side plates 17. Interposed in each space 21 is a ring 22 of hardened steel whose outer diameter is substantially less than the inner diameter of the outer race 14, as shown in exaggerated form in Figs. 2 and 3, and whose inner diameter is slightly larger than the outer diameter of inner race 15, so that the rings 22 are not loose radially but are nevertheless free to rotate about the axis of the bearing in the manner described. The thickness of each of the rings 22 is slightly less than the axial width of the corresponding space 21, so that freedom of rotation of the rings 22 is provided with but little axial movement of the needles 19.

In operation of the needle bearing of this invention, particularly in the oscillating pendulous damping device illustrated in Fig. 1, and other similar apparatus, the bearings are submitted to very heavy loads and high frequency oscillation as the pendulous mass oscillates in the plane of rotation of the cheek 11 in response to torsional vibration of the crankshaft 9. The consequent rapid reversals in the direction of relative movement between the inner and outer races 15 and 14, respectively, of the bearing, tends to cause spiralling of the needles 19, that is, angular disarrangement thereof out of the radial plane. This spiralling produces extremely high end thrusts of the needles 19 on the retaining side plates of the bearing, thus producing a serious load on the needles and bearing and, because of the rubbing between the ends of the needles and the retaining side plates, the spiralling tendency is augmented. The interposition of the floating washers 22 between the ends of the needles 19 and the retaining side plates 17 eliminates this drag on the needles 19, since the washers 22 are free to move. Accordingly, the spiralling of the needles 19, which causes end thrust of the needles on the washers 20 results in relative rotation of the washers 22 with respect to the retaining side plates 17, so that the end load is absorbed by the washers 22. The rounding of the ends 20 of the needles 19, preferably with a radius three or more times the diameter of the needle, reduces the concentration of the end load against the washers 22.

It will be seen that under conditions of operation such as those described, a needle bearing, in order to produce satisfactory and safe operation, must be relieved of the end loads imposed on its needles as the result of such operation, and this invention has proved highly successful under such conditions for, by means of it, satisfactory operation of the needle bearing has been restored. In other environments, such as needle bearings used in the wrist pin and crankshaft connections of an engine connecting rod, where the loads on the bearings likewise vary and the relative movement between the bearing races is alternately one of rapid acceleration and deceleration, the improvements of this invention also contribute to the successful operation of a needle bearing. Other uses of the improvements of this invention will be obvious wherever needle bearings are employed.

While a preferred embodiment of this invention has been illustrated and described herein, it is to be understood that the invention is not limited thereby but is susceptible of changes in form and detail within the scope of the appended claims.

I claim:

1. In a needle bearing, the combination of radially-spaced inner and outer races forming an annulus, transverse members extending at least partly across the annulus, needles having rounded ends arranged parallel to the axis of rotation of the bearing within the said annulus and between said transverse members, and substantially identical thin rings having opposite substantially plane parallel surfaces interposed between each of the ends of said needles and the corresponding transverse member and within said annular space, said rings being sufficiently light in weight to render them capable of free independent rotation in either direction during operation of said bearing in response to drag of the needles thereon.

2. In a needle bearing, the combination of radially-spaced inner and outer races forming an annulus, needles having rounded ends in the annulus arranged substantially parallel to the axis of rotation, retaining means at opposite ends of said needles and spaced therefrom, and substantially identical rings having closely spaced opposite substantially plane parallel surfaces mounted for rotation relative to said races in the annulus within the spaces between the ends of the needles and the corresponding retaining means, said rings being sufficiently light in weight to permit them to rotate relatively to the races to follow the needles during spiralling of the same.

3. In a needle bearing, the combination of radially-spaced inner and outer races forming an annulus, needles having rounded ends in the annulus arranged substantially parallel to the axis of said annulus, retaining means at opposite ends of said needles and spaced therefrom, and substantially identical rings having opposite substantially plane parallel surfaces mounted in the annulus within the spaces between the ends of the needles and the corresponding retaining means, the axial dimension of each ring being less than the axial width of the corresponding space and the diameter of said needles, each ring being sufficiently light in weight to permit freedom of rotation of said ring in response to the drag thereon by the needles during spiralling thereof.

ALFRED T. GREGORY.